(12) United States Patent
Chidambara et al.

(10) Patent No.: US 12,519,634 B2
(45) Date of Patent: Jan. 6, 2026

(54) AUTOMATIC IN-BAND MEDIA ACCESS CONTROL SECURITY (MACsec) KEY UPDATE FOR RETIMER DEVICE

(71) Applicant: Avago Technologies International Sales Pte. Limited, Singapore (SG)

(72) Inventors: Sundararajan Chidambara, Austin, TX (US); Ramakrishna Reddy Jakka, Austin, TX (US); Sathish Reddy Yenna, Cedar Park, TX (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 611 days.

(21) Appl. No.: 17/862,160

(22) Filed: Jul. 11, 2022

(65) Prior Publication Data

US 2024/0015009 A1   Jan. 11, 2024

(51) Int. Cl.
*H04L 9/08*   (2006.01)
*H04L 9/40*   (2022.01)

(52) U.S. Cl.
CPC ............ *H04L 9/0891* (2013.01); *H04L 9/088* (2013.01); *H04L 63/0245* (2013.01); *H04L 63/162* (2013.01); *H04L 63/18* (2013.01)

(58) Field of Classification Search
CPC ............................... H04L 9/088; H04L 9/0891
See application file for complete search history.

(56) References Cited

U.S. PATENT DOCUMENTS

| | | | |
|---|---|---|---|
| 10,652,024 B2 | 5/2020 | Holness | |
| 11,101,999 B2 | 8/2021 | Leavy et al. | |
| 2019/0052617 A1* | 2/2019 | Chen | H04L 9/3234 |
| 2019/0191307 A1 | 6/2019 | Sheng et al. | |
| 2021/0176255 A1* | 6/2021 | Hill | H04L 9/3234 |

(Continued)

FOREIGN PATENT DOCUMENTS

| | | |
|---|---|---|
| CN | 103475465 B | 2/2017 |
| CN | 111885430 A | 11/2020 |

(Continued)

OTHER PUBLICATIONS

BCM82391 28-nm Dual 100G MACsec Retimer PHY, Product Description, retrieved from.

*Primary Examiner* — Phy Anh T Vu
(74) *Attorney, Agent, or Firm* — Quarles & Brady LLP (57) ABSTRACT

A system for automatic in-band MACsec encryption key updates includes a physical layer retimer device attachable to a host system, the host system connected to a peer device via a secure Ethernet link incorporating egress and ingress channels for encrypted data traffic. The host system generates encryption key updates for each secure egress or ingress channel, sending the key updates in-band as Ethernet packets via the secure egress channels. Key updates are identified and extracted from egress data traffic by the retimer device, which identifies the specific encryption key (e.g., corresponding to a specific egress channel or ingress channel) for which each key update is intended. Security blocks of the retimer device update the appropriate encryption key corresponding to each key update. The retimer device generates an acknowledgement packet for each successful key update, sending the acknowledgement packet back to the host device to confirm the key update.

17 Claims, 4 Drawing Sheets

(56) References Cited

U.S. PATENT DOCUMENTS

| | | |
|---|---|---|
| 2021/0218548 A1* | 7/2021 | Abraham ............ H04L 63/0428 |
| 2021/0377226 A1 | 12/2021 | Gupta et al. |
| 2021/0391984 A1 | 12/2021 | Florit et al. |
| 2022/0029800 A1 | 1/2022 | Sergeev et al. |
| 2022/0158826 A1* | 5/2022 | Gordon ................ H04L 9/0869 |
| 2023/0361992 A1* | 11/2023 | Mundra ................ H04L 9/0819 |

FOREIGN PATENT DOCUMENTS

| | | |
|---|---|---|
| CN | 108270523 B | 4/2021 |
| WO | 2007066943 A1 | 6/2007 |

\* cited by examiner

AUTOMATIC IN-BAND MEDIA ACCESS CONTROL SECURITY (MACsec) KEY UPDATE FOR RETIMER DEVICE

FIELD OF THE INVENTION

Embodiments of the inventive concepts disclosed herein are directed generally toward secure Ethernet communications, and more particularly to retimer applications over a large number of secure channels.

BACKGROUND

Media access control security (MACsec) retimer devices are used in secure Ethernet links (e.g., host-to-host, host-to-switch) to encrypt or decrypt Ethernet traffic close to the physical (PHY) layer. For example, a retimer encrypts outbound (egress) traffic sent by the host device and decrypts inbound (ingress) traffic received by the host device. MACsec retimers may have as many as several hundred secure data channels, each data channel using encryption keys (e.g., Advanced Encryption Standard (AES)/Galois/Counter Mode (GCM)) to encrypt or decrypt traffic within that channel. AES/GCM encryption keys, for example, must be updated every second. This encryption key is derived by the host device and communicated to the retimer device via control registers, e.g., management data input/output (MDIO) registers. While MDIO register hardware can support a large number of secure channels, slow data rates associated with MDIO limit the speed at which encryption keys can be refreshed before the keys expire (e.g., if not refreshed within one second). Low throughput associated with MDIO presents a bottleneck on the number of secure channels supportable by the secure Ethernet system in practice.

SUMMARY

In a first aspect, a physical-layer media access control security (MACsec) retimer device is disclosed. In embodiments, the retimer device is physically connectible to a host device and includes a system-side receiver and transmitter for data communication with the host device respectively via N secure egress channels and N secure ingress channels (e.g., via which the host device may maintain a secure Ethernet link to one or more peer devices), where N is an integer. The retimer device includes security blocks for encrypting egress data traffic in transit from the host device to the peer devices via the secure egress channels and decrypting data traffic in transit to the host device via the secure ingress channels, based on MACsec encryption keys specific to the egress or ingress channel. The host device generates key updates for each encryption key and sends the key updates in-band, via the egress data channels. The retimer device includes packet filtering logic for identifying and extracting from egress data traffic each encryption key update generated by the host device and forwarding the key update to a microcontroller in communication with the security blocks. The retimer device identifies the specific egress or ingress channel associated with each extracted key update and updates the corresponding encryption key based on the key update.

In a further aspect, a system is disclosed. In embodiments, the system includes a host network device and a retimer device (e.g., a physical-layer MACsec retimer device) physically connected to the host device, and via which retimer device the host network device may establish a secure Ethernet link to one or more peer network devices remotely located from the local host network device. The secure ethernet link includes, for each connected peer device, a secure unidirectional egress channel (via which the host device transmits encrypted data packets to the peer device) and a secure unidirectional ingress channel (via which the host device receives encrypted data packets from the peer device). The retimer device encrypts egress (outbound) data packets transmitted by the host device, and decrypts ingress (inbound) data packets for receipt by the host device, according to an encryption key specific to that egress and ingress channel. In embodiments, the host device may generate key updates for each encryption key and transmits the key updates in-band via the secure egress channels. The retimer device identifies each key update from outbound data traffic and the specific egress/ingress channel for which the key update is intended. The retimer device updates the encryption key corresponding to the identified egress/ingress channel based on the key update.

In a further aspect, a method for in-band encryption key updating is disclosed. IN embodiments, the method includes providing an Ethernet link between a host network device and a peer network device, the link including a secure egress channel via which the host device transmits encrypted data packets to the peer device and a secure ingress channel via which the host device receives encrypted data packets transmitted by the peer device. The method includes providing, via a retimer device physically attached to the host device, security blocks for encrypting data packets sent to the peer device via the secure egress channel (and decrypting data packets sent to the host device from the peer device via the secure ingress channel) according to an encryption key specific to the egress channel and/or the ingress channel. The method includes generating, via the host device, a key update for the encryption key. The method includes generating an Ethernet data packet based on and including the key update. The method includes transmitting the key packet to the retimer device via the secure egress channel. The method includes identifying, via the retimer device, the key packet from egress data traffic in transit via the secure egress channel. The method includes determining, via the retimer device, the egress channel and/or ingress channel for which the key update associated with the key packet is intended. The method includes updating, via the retimer device, the encryption key corresponding to the identified egress/ingress channel according to the key update.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to retimer devices and applications providing automatic in-band updating of media access control (MAC) security (MACsec) encryption keys. Providing key updates in-band, via high-speed data lanes rather than via control registers, prevents the relatively slow data rate of the control registers from acting as a bottleneck on the speed at which encryption keys can be updated before they expire, allowing users to maximize the number of secure channels supportable by the secure Ethernet link.

Figure 1:
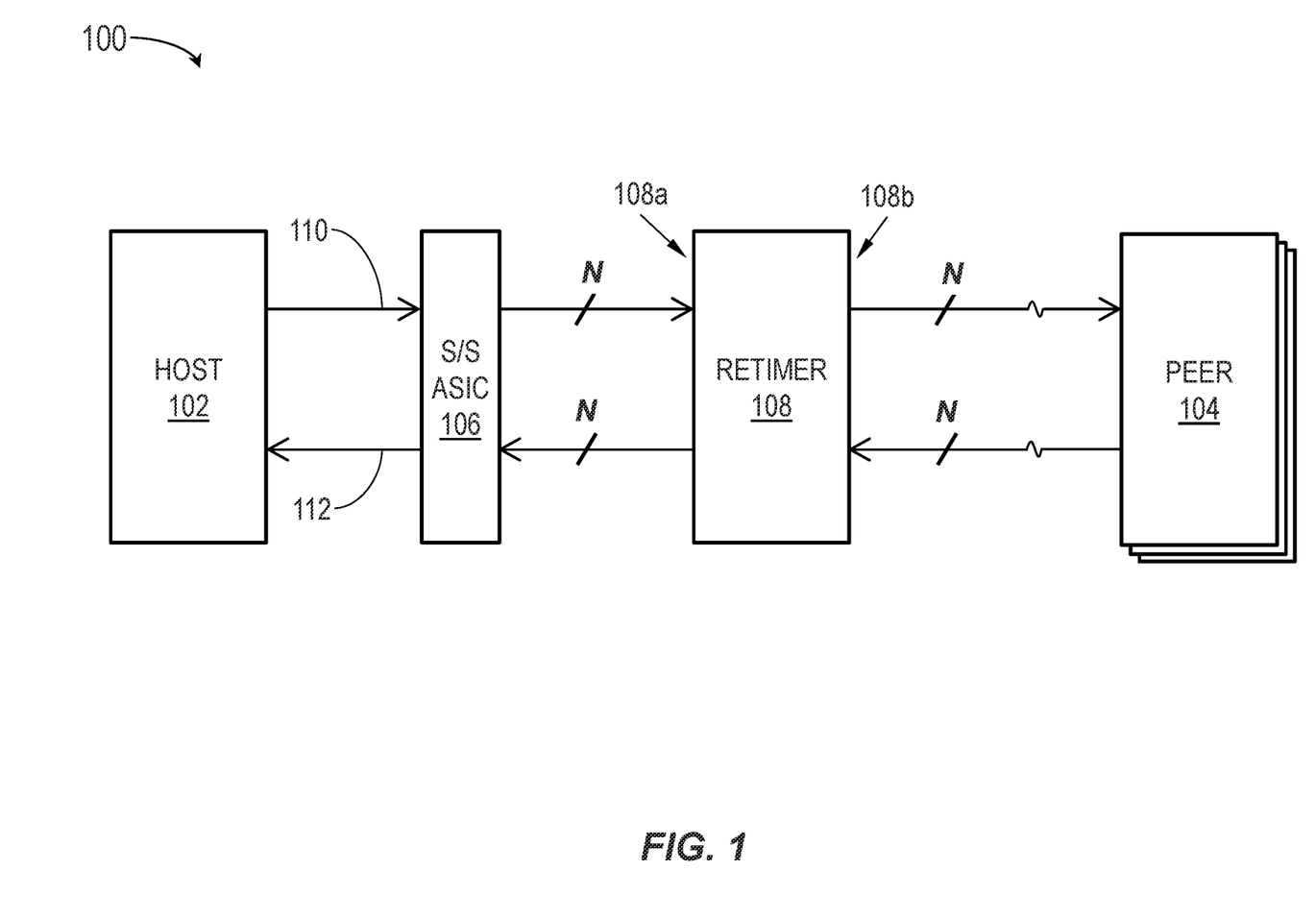
FIG. 1 is a block diagram illustrating a host device configured for maintaining a secure Ethernet link to one or more peer devices according to example embodiments of this disclosure.

Referring to FIG. 1, a secure Ethernet communications system 100 is shown. The system 100 may include a host network device 102, one or more peer network devices 104, a system-side application-specific integrated circuit 106 (ASIC; e.g., switch), a physical layer (PHY) media access security (MACsec) retimer device 108 (e.g., retimer chip), and a secure Ethernet link (e.g., wired or other like physical connection) incorporating N secure egress channels 110 and N secure ingress channels 112 (e.g., wherein N is an integer).

In embodiments, the host device 102 may be any local computing device or network node connected to the one or more peer devices 104 (e.g., also network nodes) via the secure Ethernet link, wherein the host device is a local network node and each peer device is a remote network node. For example, the host device 102 and each peer device 104 may be members of a MACsec connectivity association consisting of a secure egress channel 110 and a secure ingress channel 112. The secure egress channel 110 may be a unidirectional data channel (e.g., data lane) via which the host device 102 transmits encrypted data packets to the peer device 104; likewise, the secure ingress channel 112 may be a unidirectional channel via which the host device 102 receives encrypted data packets from the peer device 104.

In embodiments, the host device 102 may communicate with the peer devices 104 via encrypted data packets transmitted and received via the secure egress and ingress channels 110, 112. For example, the system-side ASIC 106 may be a data link/Layer 2 switch or like device physically coupled directly to the host device 102 and electronically interposed between the host device and the peer device/s 104. The system-side ASIC 106 may route egress (e.g., outbound) data packets from the host device 102 to the appropriate peer device 104 through the appropriate secure egress channel 110 at the physical (PHY) layer, e.g., based on a destination MAC address within the data link layer of the corresponding Ethernet frame.

In embodiments, the retimer device 108 may have a system side 108a (e.g., proximate to the host device 102) and a line side 108b (e.g., opposite the system side, proximate to the peer devices 104 and to the line (physical Ethernet link) connecting the retimer device to the peer devices. For example, the retimer device 108 may receive, on the system side, egress data packets (e.g., data traffic outbound from the host device 102) from the system-side ASIC 106 via the N secure egress channels 110, for secure transmission via the secure egress channels to the peer device/s 104. For example, the retimer device 108 may encrypt each egress data packet according to an $n^{th}$ encryption key (e.g., a secure association key (SAK) according to Advanced Encryption Standard (AES)/Galois/Counter Mode (GCM), MACsec Key Agreement (MKA) protocol) specific to the $n^{th}$ of N secure egress channels 110 via which the egress data packet is in transit to its destination peer device 104 (e.g., wherein n is an integer, n≤N). Similarly, the retimer device 108 may receive, on its line side ingress encrypted data packets sent by the peer device/s 104 to the host device 102 via the $n^{th}$ secure ingress channel 112, decrypting the encrypting data packets according to the $n^{th}$ encryption key.

In embodiments, each $n^{th}$ encryption key maintained by the retimer device 108 must be updated at least every second. For example, the host device 102 may generate key updates for each encryption key associated with the N secure egress channels 110 and the N secure ingress channels 112, e.g., by deriving an updated encryption key via MKA protocol. In embodiments, the host device 102 may update each encryption key in-band by sending the key update (e.g., the updated encryption key) as an egress data packet via the N secure egress channels 110 and the system-side ASIC 106. For example, the system-side ASIC 106 may receive each key update generated by the host device 102 and format the key update as a key packet, e.g., an egress data packet to be sent via the $n^{th}$ secure egress channel 110 (or, alternatively, any other secure egress channel).

In embodiments, the retimer device 108 may identify each key packet from egress data traffic in transit through the N secure egress channels 110. For example, each key packet including a key update to an encryption key may be trapped or extracted from egress data traffic by the retimer device 108, which updates the appropriate encryption key (e.g., in the appropriate secure egress channel or secure ingress channel 110, 112) based on the extracted key update. In embodiments, when the encryption key has been updated, the retimer device 108 may indicate the successful update by generating an acknowledgement (e.g., an acknowledgement (ACK) data packet) and transmitting the acknowledgement to the host device 102 via the system-side ASIC 106 and the N secure ingress channels 112 (e.g., via the $n^{th}$ secure ingress channel).

Figure 2:
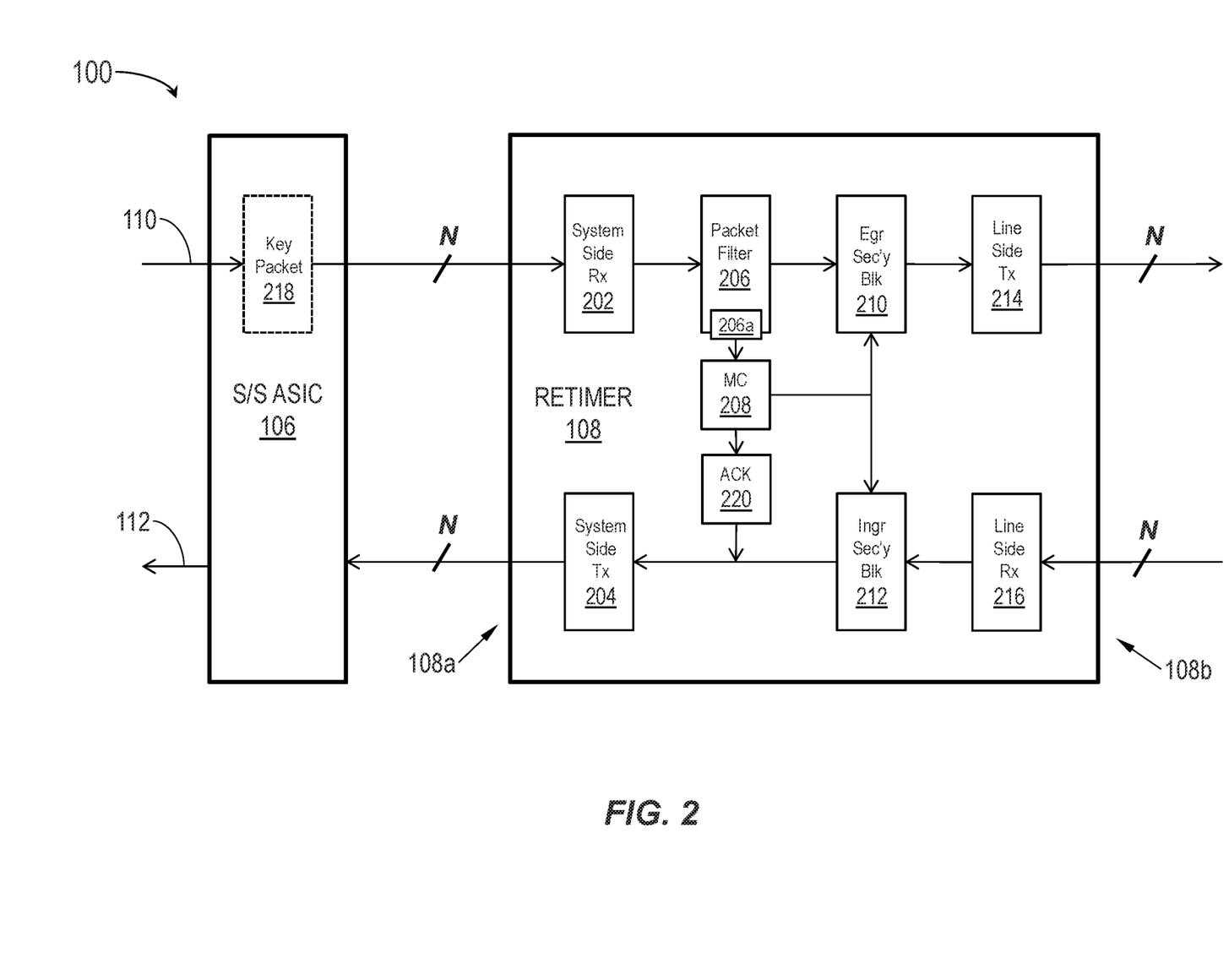
FIG. 2 is a block diagram illustrating a system-level view of a media access security (MACsec) retimer device of the system of FIG. 1.

Referring now to FIG. 2, the secure Ethernet communications system 100 is shown.

In embodiments, the system-side ASIC 106 may be physically attached directly to the host device (102, FIG. 1) and the MACsec retimer device 108 likewise physically attached directly to the system-side ASIC 106 at its system side 108a. Similarly, the retimer device 108 may physically connect to the peer device/s (104, FIG. 1) via wired or other like physical connections on its line side 108b.

In embodiments, the retimer device 108 may include system-side receiver 202 and system-side transmitter 204; packet filtering logic 206; microcontroller 208; egress security block 210 and ingress security block 212; line-side transmitter 214 and line-side receiver 216. For example, egress data traffic (e.g., egress data packets) transmitted by the host device 102 to the peer device/s 104 via the N secure egress channels 110 may be received by the retimer device 108 via the system-side receiver 202. In embodiments, the egress security block 210 may include programmable hardware, e.g., programmable by the host device 102 to encrypt egress data packets in transit through a particular $n^{th}$ secure egress channel 110 according to the $n^{th}$ encryption key corresponding to the $n^{th}$ secure egress channel (e.g., to the connectivity association including the $n^{th}$ secure egress channel 110 and secure ingress channel 112 connecting a particular host device 102 and peer device 104). The encrypted egress data packets may be forwarded to their destination peer device 104 (e.g., via the appropriate $n^{th}$ secure egress channel 110) by the line-side transmitter 214. Similarly, the ingress security block 212 may likewise include programmable hardware for decrypting ingress data packets received from the peer device 104 via the $n^{th}$ secure ingress channel 112 and the line-side receiver 216. The decrypted ingress data packets may be forwarded on to the host device 102 via the system-side transmitter 204.

In embodiments, the host device 102 may generate encryption key updates as needed (e.g., for each of the N encryption keys corresponding to the N secure egress channels 110 and the N secure ingress channels 112, or to each connectivity association). For example, the host device 102 may generate encryption key updates via MKA key protocol exchange, sending the key update for each $n^{th}$ secure egress channel 110 or secure ingress channel 112 through the system-side ASIC 106. In embodiments, the system-side ASIC 106 may format each received encryption key update as an Ethernet key packet 218, e.g., similarly to other Ethernet packets (egress data packets) sent via the secure egress channels 110. For example, formatted key packets 218 may be sent through the secure egress channels 110 along with other secure data traffic (e.g., egress data packets). In some embodiments, a key update for an $n^{th}$ secure egress channel 110 may be sent via the $n^{th}$ secure egress channel; in other embodiments, key updates may be sent via any available secure egress channel through the retimer device 108.

In embodiments, the packet filtering logic 206 may be a programmable hardware component of the retimer device 108. For example, the packet filtering logic 206 may be programmed (e.g., by the host device 102) to identify and extract each key packet 218 from egress data traffic through the secure egress channels 110, extracting the key update from the key packet and forwarding the key update to the microcontroller 208 for processing. Each key packet 218 may include information about the specific secure egress channel 110 or secure ingress channel 112 to be updated. In embodiments, the packet filtering logic 206 may be programmed to inspect egress data traffic through selected secure egress channels 110 (e.g., or all secure egress channels). For example, the packet filtering logic 206 may be programmed to inspect one or more specific portions or fields of an Ethernet frame (e.g., source address, destination address, EtherType fields, virtual local area networking (VLAN) tag) to identify a key packet 218 based on, e.g., frame portions or fields inconsistent with any current peer device 104 or with any egress data traffic in transit through the secure egress channels 110. In embodiments, the packet filtering logic 206 may mark any egress data packet identified as a key packet 218 and route the key packet to a buffer 206a for retrieval by the microcontroller 208.

In embodiments, the microcontroller 208 may include firmware or programmable hardware for inspecting each key packet 218 trapped in the buffer 206a by the packet filtering logic 206. For example, each key packet 218 may include an identifier field indicating to the microcontroller 208 the specific secure egress channel 110 or secure ingress channel 112 for which the corresponding key update is intended. In some embodiments, the microcontroller 208 may determine the secure egress channel 110 for which the key update is intended based on e.g., a source address, destination address, EtherType, or other like identifier field indicative of the target secure egress channel 110 or secure ingress channel 112. In embodiments, the microcontroller 208 may direct the egress security block 210 as appropriate to update the encryption key corresponding to the secure egress channel 110 or secure ingress channel 112 indicated by the key packet 218.

In embodiments, when the egress security block 210 or ingress security block 212 has successfully updated the encryption key corresponding to the secure egress channel 110 or secure ingress channel 112 indicated by the key packet 218, the microcontroller 208 may generate an acknowledgement packet 220 indicative of the successful key update. The retimer device 108 may transmit each acknowledgement packet 220 to the host device 102 (e.g., via the system-side transmitter 204 and system-side ASIC 106) to confirm the successful key update operation.

Figure 3A:
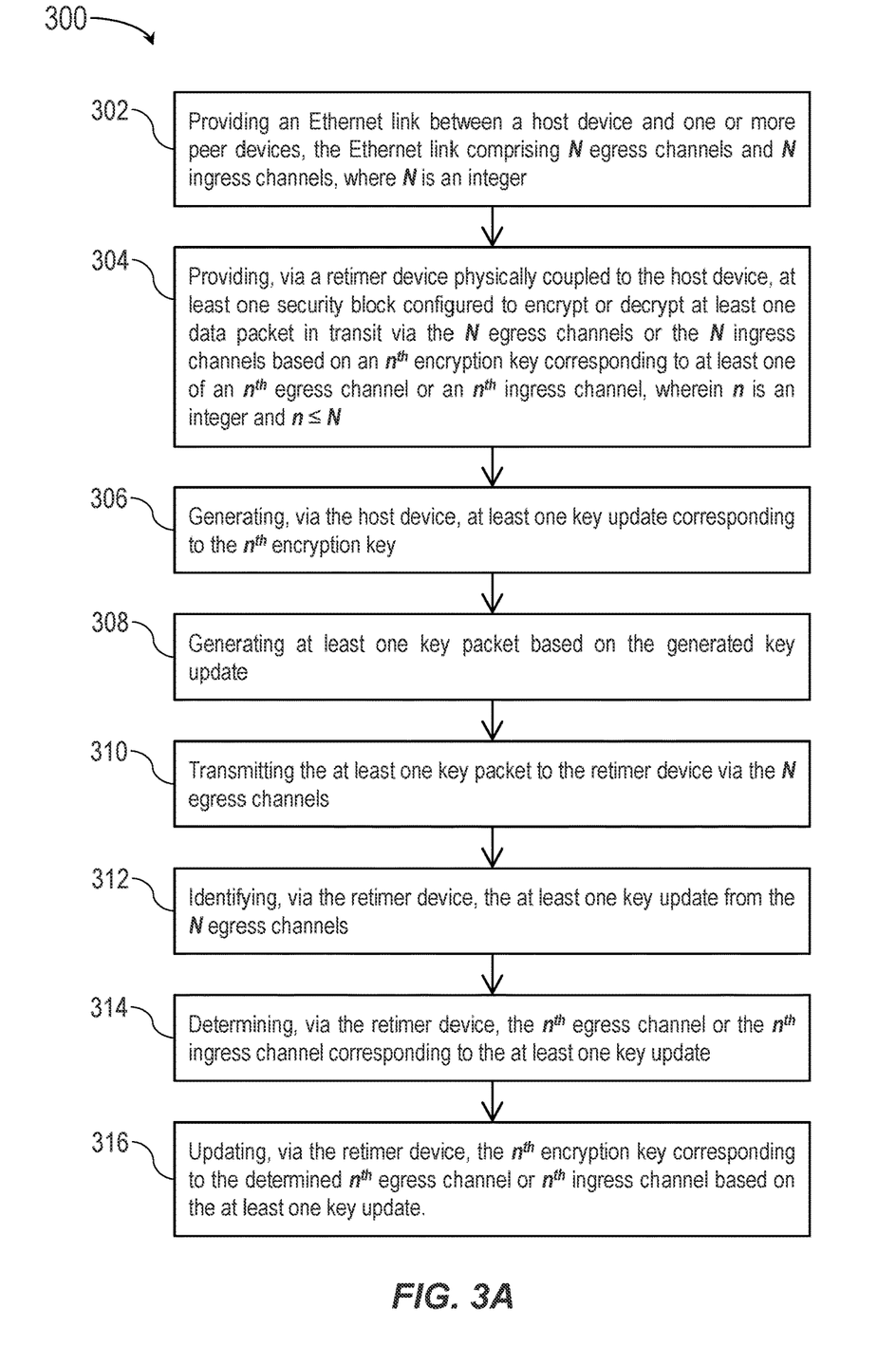
FIGS. 3A and 3B are process flow diagrams illustrating a method for in-band MACsec key updating according to example embodiments of this disclosure.

Referring now to FIG. 3A, the method 300 may be implemented by the Ethernet communications system 100 and may include the following steps.

At a step 302, the system provides an Ethernet link between a network host device (e.g., local device) and one or more network peer devices (e.g., remote devices) incorporating N egress channels (e.g., for communications from the host device to each peer device) and N ingress channels (e.g., for communications from the peer devices to the host device).

At a step 304, a retimer device physically connected to the host device provides security blocks for encryption of data packets in transit from the host device to the peer devices through the egress channels (and for decryption of data packets in transit to the host device from the peer devices through the ingress channels). For example, a link from the host device to a particular peer device may include an $n^{th}$ egress channel for outbound communications (e.g., from the host device) and an $n^{th}$ ingress channel for inbound communications (e.g., to the host device), wherein egress and ingress data traffic are encrypted and decrypted according to an $n^{th}$ encryption key.

At a step 306, the host device generates a key update for the $n^{th}$ encryption key.

At a step 308, a system-side ASIC interposed between the host device and the retimer device generates a key packet, e.g., a data packet based on the key update for the $n^{th}$ encryption key.

At a step 310, the system-side ASIC transmits the key packet through the Negress channels (e.g., toward the peer device, toward the retimer device).

At a step 312, the retimer device identifies the key update from outbound data packets (e.g., including the key packet) in transit through the N egress channels.

At a step 314, the retimer device determines the particular $n^{th}$ encryption key (e.g., the particular $n^{th}$ egress or ingress channel) for which the key update is intended.

At a step 316, the retimer device updates the $n^{th}$ encryption key based on the key update.

Figure 3B:
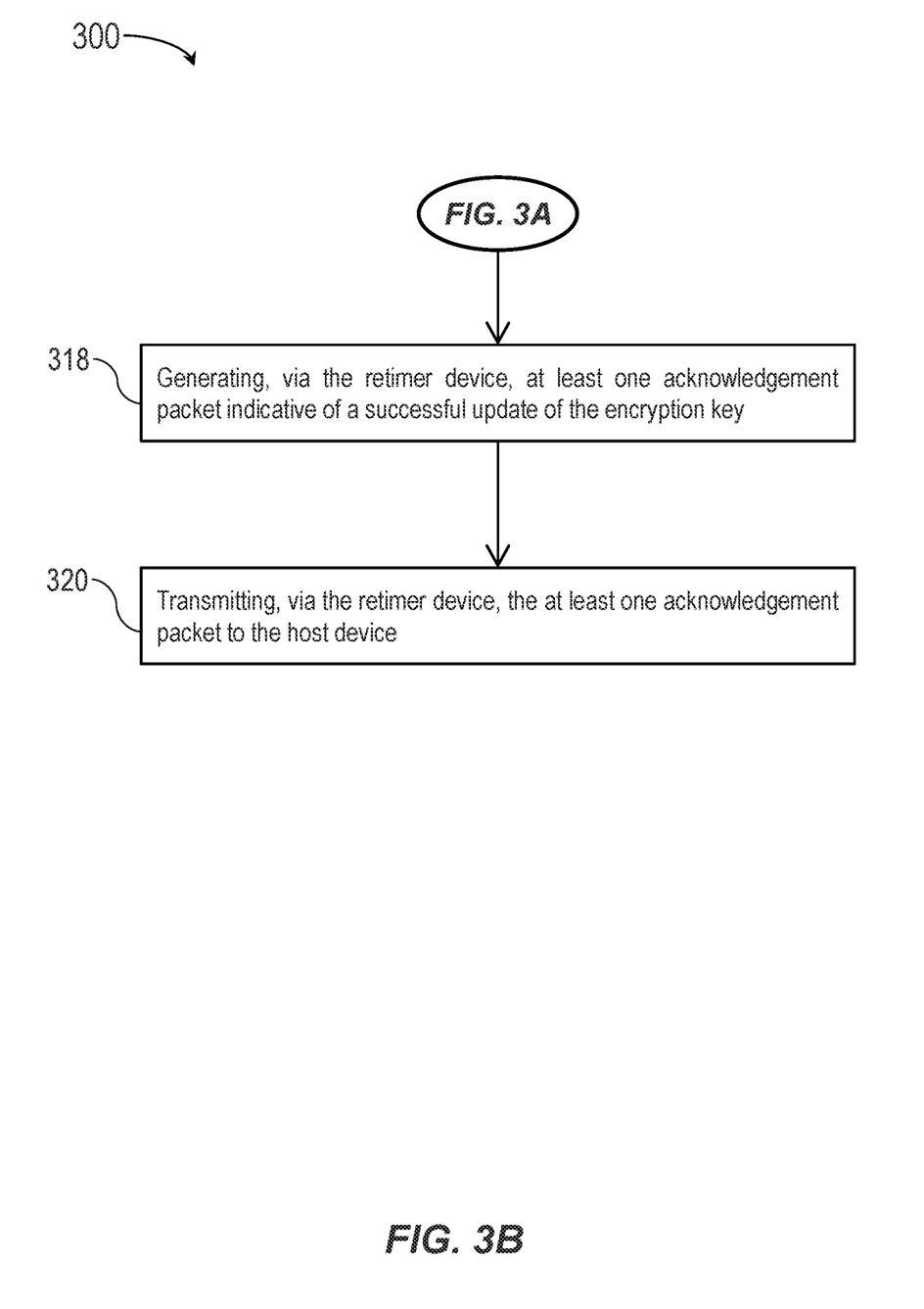

Referring also to FIG. 3B, the method 300 may include additional steps 318 and 320. At the step 318, the retimer device generates an acknowledgement packet indicative of the successful update of the $n^{th}$ encryption key.

At the step 320, the retimer device transmits the acknowledgement packet to the host device.

Embodiments of the inventive concepts disclosed herein enable a method for automatic in-band MACsec encryption key updating via a retimer device physically connected to a host device. The host device generates encryption key updates for each encryption key associated with a secure egress channel and/or a secure ingress channel (e.g., a connectivity association consisting of an egress channel and an ingress channel) of the secure Ethernet link between the host device and a peer device. The encryption key updates are formatted (e.g., via system-side ASIC physically interposed between the host device and the retimer device) into Ethernet key packets and sent in-band through the retimer device via the secure egress channels. The retimer device identifies and extracts the key packet (and corresponding key update) from egress data traffic and determines the specific secure egress channel or secure ingress channel to be updated. The retimer device updates the encryption key corresponding to the determined egress channel or ingress channel based on the key update. In some embodiments, the retimer device additionally generates an acknowledgement of the successful key update and sends the acknowledgement to the host device via the secure ingress channels.

By sending key updates in-band via the retimer device, the system may maximize the number of supportable secure egress and ingress channels by bypassing the use of register interfaces (e.g., management data input/output (MDIO)) for encryption key updates. For example, the relatively low data throughput rate of register interfaces limits the number of encryption keys that can be updated within the required time window (e.g., an encryption key not updated within the one-second window will expire). Higher throughput rates via the secure egress channels instead of the register interfaces allows a greater number of encryption keys to be updated before the keys expire, increasing the number of secure channels supportable by the system and freeing up the register interfaces for other data communications.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely explanatory embodiments thereof, it is the intention of the following claims to encompass and include such changes. Furthermore, any of the features disclosed in relation to any of the individual embodiments may be incorporated into any other embodiment.

We claim:

1. A device, comprising:
    a system-side receiver in data communication with a host device via a plurality of secure N egress channels, wherein N is an integer;
    a system-side transmitter in data communication with the host device via a plurality of secure N ingress channels;
    at least one security block in data communication with the system-side receiver and the system-side transmitter, the at least one security block configured to encrypt or decrypt at least one data packet in transit via the secure N egress channels or the plurality of secure N ingress channels based on an nth encryption key corresponding to at least one of an nth egress channel or an nth ingress channel, wherein n is an integer and n≤N;
    packet filtering logic in data communication with the system-side receiver, the packet filtering logic configured to identify at least one key update received from the host device, the key update corresponding to the nth encryption key, the key update being received in-band as part of an Ethernet data packet transmitted via the secure N egress channels, wherein identifying the at least one key update comprises inspect egress data traffic through selected secure N egress channels and to inspect one or more portions or fields of an Ethernet frame of the egress data traffic to identify a key packet based on frame portions or field inconsistent with a current peer device, the packet filter logic being further configured to mark egress data packet identified as the key packet and route the key packet to a buffer; and
    a microcontroller in data communication with the packet filtering logic and with the at least one security block, the microcontroller configured to:
    receive the at least one key update, wherein the at least one key update being extracted from the key packet by the packet filtering logic;
    determine, from an identifier field of the egress data packet indicating a secure egress channel or a secure ingress channel, the n-th encryption key for which the at least one key update is intended; and update the nth encryption key based on the at least one key update, wherein the device is a media access security (MACsec) retimer device and the device is in data communication with the host device via a system-side application specific integrated circuit (ASIC) physically coupled to the host device.

2. The device of claim 1, wherein the microcontroller is configured to:
generate an acknowledgement packet indicative of a successful update of the nth encryption key; and
forward, via the plurality of secure N ingress channels, the acknowledgement packet to the host device.

3. The device of claim 1, wherein the system-side ASIC configured to:
receive the at least one key update from the host device;
generate at least one key packet comprising the at least one key update, wherein the packet filtering logic is configured to identify the at least one key update based on the key packet; and
forward the at least one key packet to the device via the secure N egress channels.

4. The device of claim 3, wherein:
the at least one key packet includes the identifier field indicative of at least one of the nth ingress channel or the nth egress channel; and
wherein the microcontroller is configured to update the nth encryption key based on the identifier field.

5. The device of claim 4, wherein the identifier field includes at least one of a source address, a destination address, or an EtherType.

6. The device of claim 1, wherein the at least one security block includes:
at least one egress security block configured to encrypt at least one egress data packet in transit via the secure N egress channels; and
at least one ingress security block configured to decrypt at least one ingress data packet in transit via the plurality of secure N ingress channels.

7. A system, comprising:
a host device configured for establishing an Ethernet link to at least one peer device, the Ethernet link comprising:
secure N egress channels configured for transmission of one or more egress data packets from the host device to the at least one peer device, wherein N is an integer; and
secure N ingress channels configured for reception of one or more ingress data packets from the at least one peer device to the host device; and
a media access security (MACsec) retimer device physically coupled to the host device via a system-side application specific integrated circuit (ASIC) and electronically interposed between the host device and the at least one peer device, the MACsec retimer device comprising:
a system-side receiver in data communication with the host device via the secure N egress channels;
a system-side transmitter in data communication with the host device via the secure N ingress channels;
at least one security block in data communication with the system-side receiver and the system-side transmitter, the at least one security block configured to encrypt or decrypt at least one data packet in transit within the Ethernet link based on an nth encryption key corresponding to at least one of an nth egress channel or an nth ingress channel, wherein n is an integer and n≤N;
packet filtering logic in data communication with the system-side receiver, the packet filtering logic configured for identifying at least one key update generated by and received from the host device via the N egress channels, the at least one key update corresponding to the nth encryption key, the key update being received in-band as part of an Ethernet data packet transmitted via the secure N egress channels, the identifying at least one key update comprises inspect egress data traffic through selected secure egress channels and to inspect one or more portions or fields of an Ethernet frame of the egress data traffic to identify a key packet based on frame portions or field inconsistent with the at least one peer device, the packet filter logic being further configured to mark egress data packet identified as the key packet and route the key packet to a buffer; and
a microcontroller in data communication with the packet filtering logic and with the at least one security block, the microcontroller configured to:
receive the at least one key update, wherein the at least one key update being extracted from the key packet by the packet filtering logic;
determine, from an identifier field of the egress data packet indicating a secure egress channel or a secure ingress channel, the n-th encryption key for which the at least one key update is intended; and
update the nth encryption key based on the at least one key update.

8. The system of claim 7, wherein the microcontroller is configured to:
generate at least one acknowledgement packet indicative of a successful update of the nth encryption key; and
forward, via the system-side transmitter, the acknowledgement packet to the host device.

9. The system of claim 7, further comprising:
the system-side ASIC configured to:
receive the at least one key update from the host device;
generate at least one key packet comprising the at least one key update, wherein the packet filtering logic is configured to identify the at least one key update based on the key packet; and
forward the at least one key packet to the MACsec retimer device via the secure N egress channels.

10. The system of claim 9, wherein:
the at least one key packet includes the identifier field corresponding to at least one of the nth ingress channel or the nth egress channel; and
wherein the microcontroller is configured to update the nth encryption key based on the identifier field.

11. The system of claim 10, wherein the identifier field includes at least one of a source address, a destination address, or an EtherType.

12. The system of claim 7, wherein the at least one security block includes:
at least one egress security block configured to encrypt at least one egress data packet in transit via the secure N egress channels; and
at least one ingress security block configured to decrypt at least one ingress data packet in transit via the secure N ingress channels.

13. A method, comprising:
providing an Ethernet link between a host device and one or more peer devices, the Ethernet link comprising secure N egress channels and secure N ingress channels, where N is an integer;
providing, by a media access security (MACsec) retimer device physically coupled to the host device via a system-side application specific integrated circuit (ASIC), at least one security block configured to encrypt or decrypt at least one data packet in transit via the secure N egress channels or the N ingress channels based on an nth encryption key corresponding to at least one of an nth egress channel or an nth ingress channel, wherein n is an integer and n≤N;
generating, via the host device, at least one key update corresponding to the nth encryption key;
generating at least one key packet based on the at least one key update generated;
transmitting the at least one key packet to the MACsec retimer device via the secure N egress channels;
inspect egress data traffic through selected secure egress channels and to inspect one or more portions or fields of an Ethernet frame of the egress data traffic to identify a key packet based on frame portions or field inconsistent with the one or more peer devices;
mark egress data packet identified as the key packet and route the key packet to a buffer;
identifying, via the MACsec retimer device, the at least one key update from the secure N egress channels, the at least one key update being extracted from the key packet and being received in-band as part of an Ethernet data packet transmitted via the secure N egress channels;
determining, from an identifier field of the egress data packet, via the MACsec retimer device, the nth egress channel or the nth ingress channel, the n-th encryption key for which the at least one key update is intended; and
updating, via the MACsec retimer device, the nth encryption key to the nth egress channel or nth ingress channel based on the at least one key update.

14. The method of claim 13, further comprising:
generating, via the MACsec retimer device, at least one acknowledgement packet indicative of a successful update of the encryption key; and
transmitting, via the MACsec retimer device, the at least one acknowledgement packet to the host device.

15. The method of claim 13, wherein:
the generating at least one key packet based on the at least one key update includes:
  receiving the at least one key update via the system-side application specific integrated circuit (ASIC); and
  generating the at least one key update via the system-side ASIC; and
transmitting the at least one key packet to the MACsec retimer device via the secure N egress channels includes forwarding the at least one key packet to the MACsec retimer device via the system-side ASIC.

16. The method of claim 15, wherein the identifying, via the MACsec retimer device, the at least one key update from the secure N egress channels includes:
identifying the at least one key update based on the identifier field associated with the at least one key packet, the identifier field indicative of at least one of the nth ingress channel or the nth egress channel.

17. The method of claim 16, wherein the identifier field is associated with at least one of a source address, a destination address, or an EtherType.

* * * * *